3,773,821
PROCESS FOR THE PRODUCTION OF ACETONE-
DICARBOXYLIC ACID ESTERS
Fabio Broussard, Visp, Switzerland, assignor to
Lonza Ltd., Basel, Switzerland
No Drawing. Filed Sept. 14, 1971, Ser. No. 180,466
Claims priority, application Switzerland, Sept. 15, 1970,
13,640/70
Int. Cl. C07c 67/00
U.S. Cl. 260—483                                     8 Claims

ABSTRACT OF THE DISCLOSURE

Acetone-dicarboxylic acid esters are produced by reacting phosgene at a temperature of −10° C. to 20° C. with an excess of ketene dissolved in a solvent which is liquid at the reaction temperature and has a dielectric constant of 2–8, the resulting acetone-dicarboxylic acid chloride being reacted without separation from the reaction mixture with an alcohol to produce the desired ester.

BACKGROUND OF THE INVENTION

(a) Field of the invention

The invention relates to a process for the manufacture of acetone-dicarboxylic esters.

(b) Description of the prior art

It is known that diphenyl-ketene reacts with phosgene with the formation of diphenyl-malonyl chloride (Ber. 47 (1914), page 40) and that monoalkyl-ketenes react with phosgene with the formation of the corresponding alkyl-malonyl chlorides (German patent specification No. 1,027,195). Attempts to react unsubstituted ketene with phosgene has hitherto failed. (Houben-Weyl 7/4, page 205).

SUMMARY OF THE INVENTION

It has been discovered that ketene reacts under certain conditions with phosgene with the formation of acetone-carboxylic acid chloride.

The invention contemplates a process for the production of acetone-dicarboxylic acid esters and is characterized by reacting phosgene at −10° C. to +20° C. with an excess of ketene dissolved in a solvent which is selected from organic esters and/or ethers and/or non-halogenated aromatic hydrocarbons and which has a dielectric constant of 2 to 8, measured at room temperature, reacting the resulting acetone-dicarboxylic acid chloride, without separation from the reaction mixture, with the alcohol corresponding to the ester to be produced, and finally separating the acetone-dicarboxylic acid ester from the reaction mixture.

The phosgene is expediently dissolved in the solvent at temperatures of −10° C. to 0° C., and the ketene, preferably 3 to 5 mol per mol phosgene, is subsequently introduced with continuous stirring. The reaction temperature is advantageously kept at −5° C. to +10° C. by cooling.

The ketene should expediently be used in a high degree of purity, for example, as it is obtained from the depolymerization of diketene.

Suitable solvents are esters, ethers and non-halogenated aromatic hydrocarbons which have a dielectric constant of 2 to 8. Such solvents are, for example, ethers of the formula

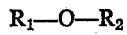

$$R_1—O—R_2$$

in which $R_1$ and $R_2$ are alkyl groups with 1 to 6 carbon atoms which together may form a ring with 5 to 6 carbon atoms in so far as the solvents have a dielectric constant of 2 to 8. Alkyl esters of acetic acid can also be used to advantage as solvents, the alkyl groups again containing 1 to 6 carbon atoms. Particular solvents which can be used according to the invention with satisfactory results include diethyl ethers, dioxane, anisole, ethyl acetate, butyl acetate, benzene, toluene, xylene etc. Ethyl acetate and dioxane are preferred.

After the reaction of the phosgene with ketene, acetone-dicarboxylic acid chloride is present in the reaction mixture. Without being isolated, this intermediate product is then reacted with an alcohol to form the corresponding acetone-dicarboxylic acid ester. The reaction is advantageously carried out under reflux conditions. The alcohols may be aliphatic or aromatic. According to the invention, aliphatic alcohols with about 1 to 6 carbon atoms are preferably used, primarily methanol, ethanol, butanol, propanol, isopropanol, etc. The preferred aromatic alcohols are pheny-alkyl-alcohols with a lower alkyl group, especially benzyl alcohols.

Prior to the isolation of the acetone-dicarboxylic acid ester, the reaction mixture present after the reaction with alcohols is advantageously concentrated by evaporation, and the ester is isolated from the concentrated residue by distillation in a vacuum.

The reaction of phosgene with ketene can be carried out under normal pressure or under excess pressure, e.g. at 10–20 atm. Working at normal pressure is preferred.

DESCRIPTION OF A PREFERRED EMBODIMENT

The invention will next be described with reference to an example showing the production of acetone-dicarboxylic acid esters.

350 ml. of dioxane were placed into a 4-neck flask which had a capacity of 1.5 litres and was fitted with a stirrer, a thermometer, a gas feed tube and a reflux condenser. One mol of phosgene (99 g.) was added thereto at 0° C., and 4 mol of ketene (168 g.) of a high degree of purity (obtained by depolymerization of diketene) were introduced with continuous stirring in the course of about 3 hours. The reflux condenser was cooled with brine (−30° C.). The reaction temperature in the flask rose to 0 to 5° C. and was kept at this level by external cooling. When the addition of ketene was terminated, 7 mol of ethanol were added dropwise so that the temperature did not rise above 30° C., and the reaction mixture was subsequently heated under reflux for one hour.

The reaction mixture was concentrated by evaporation in a rotavapor. The residue consisted of the crude product. The yield amounted to 62%, referred to phosgene. The product was subsequently distilled at 1 mm. Hg, and acetone-dicarboxylic acid diethyl ester was obtained in a yield of 58%.

When ethyl acetate, diethyl ether, benzene and toluene were used as solvents, instead of dioxane, the respective yields were, 43%, 25%, 27% and 25%.

The products obtained by the process of the invention can be utilized for various chemical synthesis, e.g. the acetone-dicarboxylic acid dimethyl ester can be employed for the production of 5,7-dihydroxy-benzotetronic acid-carboxylic acid-(6)-methylester and the acetone-dicarboxylic acid ethyl ester can be used for the production of 3-hydroxy-glutaric acid-diethyl ester, thiazole-carboxylic acid-(5)-acetic acid-(4)-diethyl ester and cyclohexanone-(2)-dicarboxylic acid-(1,3)-diethyl ester.

What is claimed is:

1. A process for the production of acetone-dicarboxylic acid esters, said process comprising reacting phosgene at a temperature of −10° C. to +20° C. with an excess of ketene dissolved in a solvent which is liquid at the reaction temperature and has a dielectric constant of 2 to 8, measured at room temperature, said solvent being selected from the group consisting of aromatic hydrocarbons, alkyl esters of acetic acid, and ethers of the formula $R_1$—O—$R_2$ wherein $R_1$ and $R_2$ are alkyl groups with 1–6 carbon atoms which may together form a ring with 5 to 6 carbon atoms and reacting the resultant acetone-dicarboxylic acid chloride, without it being separated, with an alcohol corresponding to the ester to be produced, said alcohol being selected from the group consisting of alkanols having 1 to 6 carbon atoms and phenyl lower alkanols and separating the acetone-dicarboxylic acid ester from the reaction mixture.

2. A process according to claim 1, wherein 3 to 5 mols of ketene are used per mol of phosgene.

3. A process according to claim 1 in which the reacting of phosgene with ketene is carried out at a temperature of −5° C. to +10° C.

4. A process according to claim 1 wherein the ketene is obtained by the depolymerization of diketene.

5. A process according to claim 1 wherein said solvent is ethyl acetate or dioxane.

6. A process according to claim 1 comprising effecting the reaction of the acetone-dicarboxylic acid chloride with the alcohol under reflux conditions.

7. A process according to claim 1 wherein the acetone-dicarboxylic acid ester is separated from the reaction mixture by subjecting said reaction mixture to evaporation to effect concentration, and then to distillation in a vacuum.

8. A process according to claim 1 wherein said solvent is an alkyl ester of acetic acid wherein the alkyl group has 1–6 carbon atoms.

References Cited

Berichte: 47, 1914, p. 40.
Houben-Weyl: July 4, p. 205.

VIVIAN GARNER, Primary Examiner

U.S. Cl. X.R.

260—302 R, 343.6, 468 R, 484 R, 544 K